US009873387B2

(12) United States Patent
Da Deppo et al.

(10) Patent No.: US 9,873,387 B2
(45) Date of Patent: Jan. 23, 2018

(54) VEHICLE CLOSURE RELEASE WITH ATTACHED DEPLOYABLE CAMERA

(71) Applicant: Huf North America Automotive Parts Mfg. Corp., Milwaukee, WI (US)

(72) Inventors: Lynn D. Da Deppo, Bloomfield Hills, MI (US); Ehab Kamal, Novi, MI (US); Steve Bauer, Clarkston, MI (US); David Newkirk, West Bloomfield, MI (US)

(73) Assignee: HUF NORTH AMERICA AUTOMOTIVE PARTS MFG. CORP., Milwaukee, WI (US)

( * ) Notice: Subject to any disclaimer, the term of this patent is extended or adjusted under 35 U.S.C. 154(b) by 0 days.

(21) Appl. No.: 14/581,047

(22) Filed: Dec. 23, 2014

(65) Prior Publication Data

US 2015/0183366 A1 Jul. 2, 2015

Related U.S. Application Data

(60) Provisional application No. 61/921,211, filed on Dec. 27, 2013.

(51) Int. Cl.
*B60Q 1/00* (2006.01)
*B60R 11/04* (2006.01)
*B60R 11/00* (2006.01)

(52) U.S. Cl.
CPC ......... *B60R 11/04* (2013.01); *B60R 2011/004* (2013.01); *B60R 2011/005* (2013.01);
(Continued)

(58) Field of Classification Search
CPC ... B60R 11/04; B60R 11/00; B60R 2011/004; B60R 2011/0043; B60R 2011/0045; B60R 2011/0047; B60R 2011/008; B60R 2011/0082; B60R 2011/0084; B60R 2011/0085; B60R 2011/0087; B60R 2011/0089; B60R 2011/0091; B60R 2011/0092; B60R 2011/0094; B60R 2011/0049; B60R 2011/005; B60R 2300/00; B60R 2300/60; B60R 2300/80;
(Continued)

(56) References Cited

U.S. PATENT DOCUMENTS

2005/0206173 A1* 9/2005 Lim
2006/0224280 A1* 10/2006 Flanigan ............... A63H 30/04 701/2

(Continued)

FOREIGN PATENT DOCUMENTS

WO WO 2013029718 A1 * 3/2013 ............ B60R 11/04

*Primary Examiner* — Thomas G Black
*Assistant Examiner* — Sara J Lewandroski
(74) *Attorney, Agent, or Firm* — Honigman Miller Schwartz and Cohn LLP; Brandon C. Griffith; Jonathan P. O'Brien

(57) ABSTRACT

A closure release for a closure of a vehicle has a camera attached thereto. The closure release is moveable between a primary position and a secondary position. In the primary position, the camera is in a stowed position within the closure and the closure release is in accessible for user operation. In the secondary position, the closure release is moved relative to the closure such that the camera is moved into a deployed position to provide a desired field of view.

20 Claims, 7 Drawing Sheets

(52) U.S. Cl.
CPC ................. *B60R 2011/0082* (2013.01); *B60R 2011/0085* (2013.01); *B60R 2011/0094* (2013.01); *B60R 2300/00* (2013.01)

(58) Field of Classification Search
CPC ...... B60R 2300/802; B60R 2300/8046; B60R 2300/8066; B60R 2300/8073; H04N 5/2252
See application file for complete search history.

(56) References Cited

U.S. PATENT DOCUMENTS

2006/0256459 A1* 11/2006 Izabel ..................... B60R 11/04 359/872
2007/0152798 A1* 7/2007 Witkowski ............. G08C 17/02 340/5.26
2009/0309971 A1* 12/2009 Schuetz .................. B60R 11/04 348/148
2010/0040361 A1* 2/2010 Schuetz .................. B60R 11/04 396/428
2011/0210151 A1* 9/2011 Weikert .................. B60R 11/04 224/309
2011/0249120 A1* 10/2011 Bingle .................... B60R 11/04 348/148
2012/0128344 A1* 5/2012 Kwon ..................... E05B 81/06 396/429
2012/0274088 A1* 11/2012 Lennhoff
2013/0209079 A1* 8/2013 Alexander .............. B60R 11/04 396/25
2013/0235204 A1* 9/2013 Buschmann ............ B60R 11/04 348/148
2014/0197649 A1* 7/2014 Hansen ................... B60R 11/04 292/336.3
2014/0211010 A1* 7/2014 Alexander .............. B60R 11/04 348/148
2015/0097953 A1* 4/2015 Stambaugh ............. B60R 11/04 348/148
2015/0360619 A1* 12/2015 Barthel ................... B60R 11/04 348/148
2016/0236558 A1* 8/2016 Koseki .................... E05B 83/18
2017/0064161 A1* 3/2017 Buss ....................... B60R 11/04

* cited by examiner

VEHICLE CLOSURE RELEASE WITH ATTACHED DEPLOYABLE CAMERA

CROSS REFERENCE TO RELATED APPLICATIONS

This application claims the benefit of the filing date of U.S. Provisional Patent Application No. 61/921,211 filed Dec. 27, 2013, which is hereby incorporated by reference for all purposes as if set forth in its entirety herein.

FIELD OF THE INVENTION

This disclosure relates to a closure release for a motor vehicle. More particularly, this disclosure relates to a closure release having a camera coupled thereto in which the closure release is movable between multiple positions to either permit use of the closure release or to reveal the camera for use.

BACKGROUND

Motor vehicles typically include a closure release for deck lids and lift gates. When a user interacts with the closure release by contact or a lifting motion, the closure release typically decouples the closure from the vehicle body at a latched connection and permits the user to open the closure either under their own strength or with the assistance of other vehicle components (for example, lift cylinders). When the vehicle only includes a closure release on a rear closure, this closure release is typically located on a centerline of the vehicle (that is, an imaginary line through the axis of symmetry of the vehicle). This positioning of the closure release both provides an intuitive grasp location for the user as well as offering a central loading of the closure when the customer lifts the closure or one of its panels during opening.

In some instances, a rear viewing camera is also installed on the vehicle. This camera typically would also be best positioned on centerline of vehicle in order to deliver the desired field of view of the rear area of the vehicle.

However, for vehicles having both a closure release and a camera on the same closure, the current state of art is that one or both of the camera and the release assembly components associated with the closure release are positioned off of the centerline of the vehicle to allow each other to have a slightly compromised, but still adequate, positioning in order to achieve their desired functions. In some cases, the closure release must also be reduced in cross car dimension to accommodate the positioning of the two unique assemblies as close to one another as possible.

SUMMARY OF THE INVENTION

Disclosed herein is an apparatus and method of use related thereto, in which the structure of the apparatus permits for a closure release and a camera to be both located along the centerline of a vehicle in a single combined assembly.

According to one aspect of the invention, an apparatus for operating a closure of a vehicle is disclosed. The apparatus includes a closure release operable to selectively uncouple the closure from the vehicle (e.g., so the closure can be swung open) and further includes a camera coupled to the closure release. The closure release is movable between a primary position and a secondary position. The camera is stowed when the closure release is in the primary position and deployed when the closure release is in the secondary position.

The apparatus may further include an actuation mechanism for moving the closure release between the primary position and the secondary position along a path of travel. Along this path of travel, the camera may potentially rotate and/or translate relative to the closure. When the closure release is in the primary position, the camera may be stowed inside the closure. When the closure release is in the secondary position, the camera may provide a desired field of view. As one example, particularly if the apparatus is found on a rear closure of a vehicle, then when the camera is in the secondary position, the camera may be positioned to provide a rear field of view of the vehicle.

The actuation mechanism may be configured to operate in response to a signal from one or more control devices. In some forms, the actuation mechanism may be configured to operate, at least in part, in response to a signal from a mobile radio key which is assigned to the motor vehicle, to a signal from a button located in an interior of the vehicle (e.g., a door lock), and/or to a signal resulting from an operation of a gear shifting device. In the instance of the gear shifting device, the actuation mechanism may be configured to move the closure release from the primary position to the secondary position when the signal from the operation of a gear shifting device is produced in response to a user shifting the gear shifting device into reverse and the actuation mechanism may be configured to move the closure release from the secondary position to the primary position when the signal from the operation of a gear shifting device is produced in response to a user shifting the gear shifting device out of reverse (e.g., into drive, neutral, park or so forth).

The closure release may include a pivoting pad assembly having a switch thereon which is operable to actuate a latch selectively coupling the closure to the vehicle.

There are many potential benefits to the disclosure structure. As one exemplary benefit, with the structure of the apparatus, the camera and/or the closure release may be positioned on a centerline of the vehicle in both the primary position and the secondary position (as opposed to having to offset the camera relative to the closure release, providing a different off-center field of view or as opposed to having an entirely separate camera assembly apart from the closure release). Still another potential benefit is that, when the camera is stowed in the primary position, the camera may be protected from environmental debris such as, for example, road dust.

According to another aspect of the invention, a method for operating a closure of a vehicle is disclosed. In this method, an actuation mechanism is activated (for example, by reception of a signal) to move a closure release having a camera coupled thereto between a primary position and a secondary position. Again, in the primary position, the closure release is operable to selectively decouple the closure from the motor vehicle at a latch and the camera is stowed within the closure. In the secondary position, the camera coupled to the closure release is deployed (although it is noted that the closure release may be positioned in such a way that it is temporarily inaccessible for user use).

Many of the potential advantages are also applicable to the related method. As noted above, in the secondary position, the camera may provide a desired field of view (such as for example, a rear field of view from the vehicle). Further, both the camera and the closure release may be positioned on a centerline of the vehicle in both the primary position and the secondary position. Additionally, the camera may be protected from environmental debris when the camera is in the primary position in which it is stowed in the closure.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION OF THE PREFERRED EMBODIMENTS

A general understanding of the process and apparatus of this invention can be obtained by reference to the figures in which like numbers are used to refer to like parts. The figures may not be drawn to scale and have been simplified by the deletion of a large number of apparatuses customarily employed in a process of this nature, such as electrical connections, controls systems, sensors, etc. which are not specifically required to illustrate the performance of the invention. Furthermore, the illustration of the process of this invention in the embodiment of a specific drawing is not intended to limit the invention to specific embodiments set out herein.

One aspect of the present invention relates to a camera in either a stowed position or a deployed position. Furthermore, the figures may show overlays of the camera in both the stowed and deployed position. Therefore, in order to more clearly indicate in which position the camera is depicted, the letter "a" follows numbers that indicate the camera is in the stowed position (or the primary position of the closure release), whereas a letter "b" follows numbers that indicate the camera is in the deployed position (or the secondary position of the closure release). Where the description of a numbered part lacks an "a" or "b", the description refers to the part in general.

The term "vehicle" as used throughout the specification and claims refers to any moving vehicle having a closure. The term vehicle includes, but is not limited to cars, trucks, vans, minivans, SUVs, motorcycles, scooters, boats, personal watercraft, trailers, and aircraft. The term closure includes, but is not limited to a hatch, door, tailgate, trunk or any other suitable closure of a vehicle.

Figure 1:
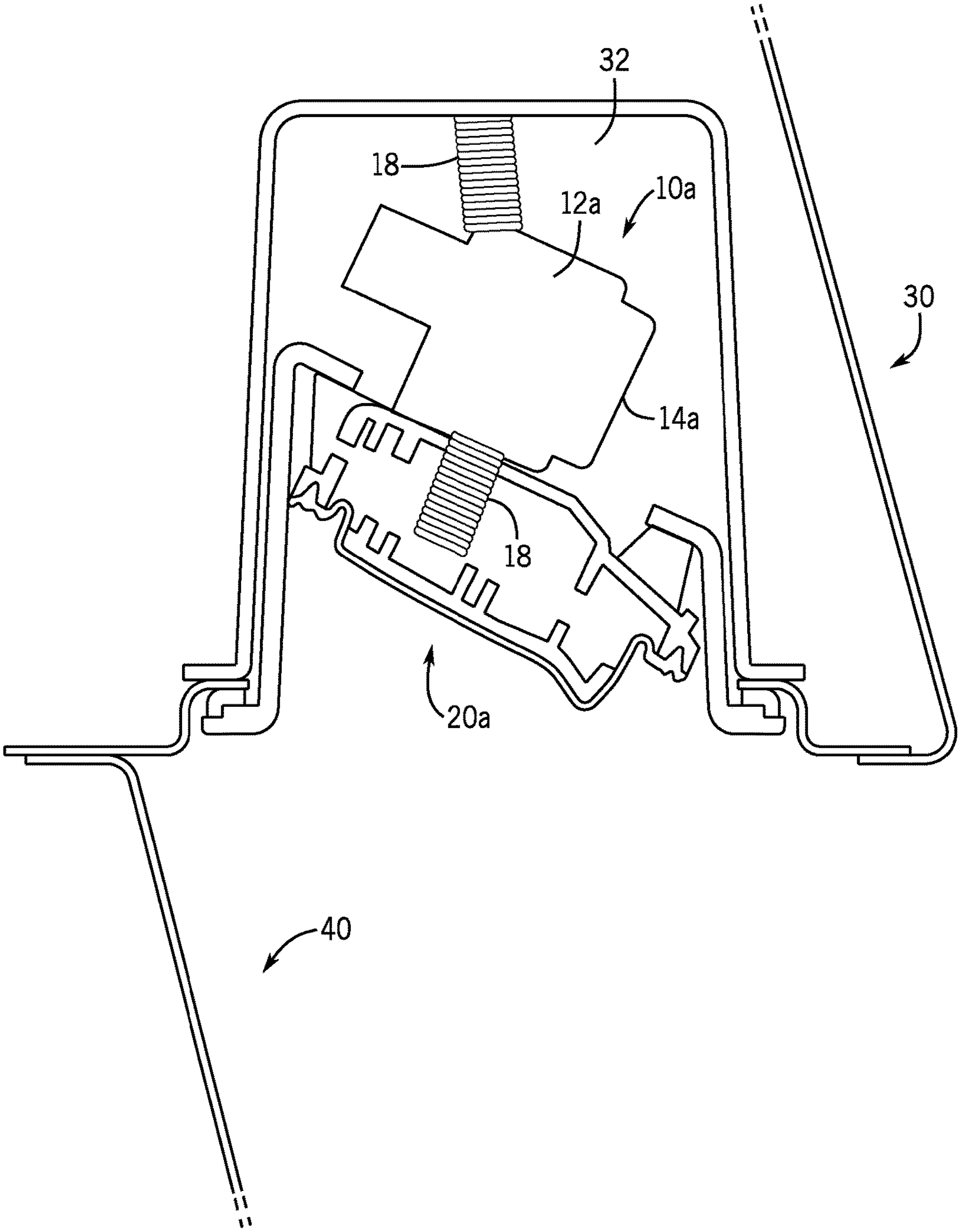
FIG. 1 is a cross-section of one embodiment of the invention whereby, a camera is illustrated in a stowed position within the closure cavity and is mounted to the back side of a closure release. The closure release, in turn, is mounted to the closure.

FIG. 1 is a cross-sectional view of a rear closure 30 of a motor vehicle 40 which is provided with a deployable camera 10*a* arranged in a cavity 32 of the rear closure 30. Further illustrated is a closure release 20*a* for reversibly and selectively decoupling the rear closure 30 form the motor vehicle 40 at an attachment latch (not shown). To open the closure, the user may contact the underside of the closure release 20 when it is in the position illustrated in FIG. 1. Although the closure release 20 may operate in a number of ways, in one form, a pivoting pad assembly having a switch thereon may be operable to actuate a latch coupling the closure 30 to the vehicle 40. This chain of action might be purely mechanical, but in modern cars is likely to be electromechanical.

Figure 2:
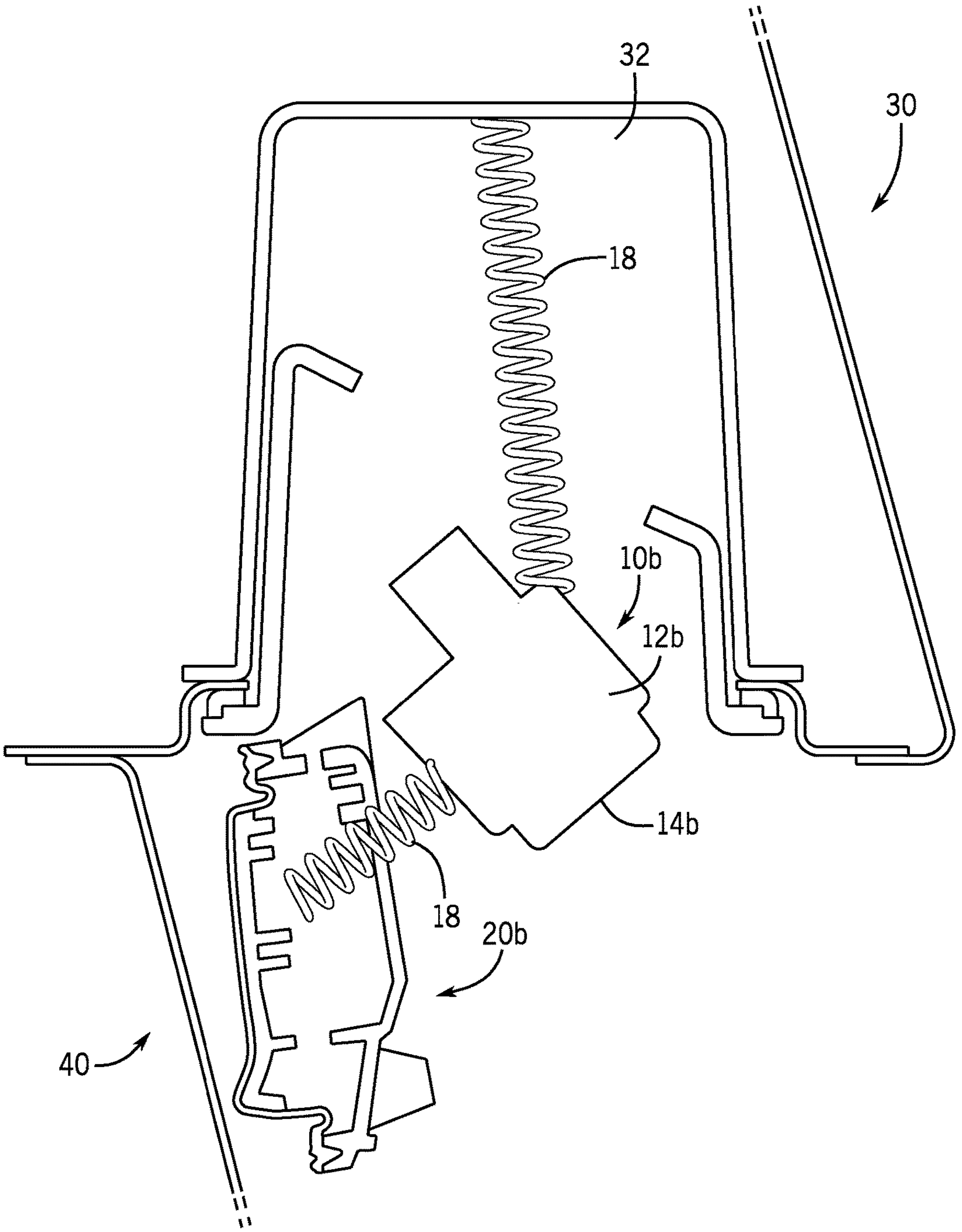
FIG. 2 is a cross-section showing the deployed position of the embodiment shown in FIG. 1, whereby, the camera is positioned such that the desired field of view for the camera is achieved. The closure release is shown translated into a position which allows the camera to deploy into the desired location.

In the illustrated embodiment of FIGS. 1 and 2, the camera 10 includes a housing 12 and an image sensor 14 arranged in the housing 12. In one embodiment, the image sensor 14 is a CCD sensor. In certain embodiments, the camera 10 is part of a backup camera system, wherein the camera 10 is electrically connected via a control unit to a display device (not shown) in the cabin of the motor vehicle 40. The display device shows a rear view of the external region behind the motor vehicle 40. This makes the process of parking and leaving a parking space easier for the user, since the user easily observes objects or persons directly behind the motor vehicle 40 with the camera 10, even if they are located outside the viewing region of the side mirrors and that of an interior mirror arranged within the vehicle 40. Alternatively, or in addition, the camera 10 can be useful for viewing a vehicle hitch connected to the rear of the motor vehicle 40. In this way the camera 10 is useful for aligning a vehicle hitch with a trailer or other towable object In the views depicted in FIGS. 1 and 2, the position of the camera 10 relative to the cavity 32 is established way of attachments 18 in the form of a pair of opposing springs in order to couple the housing 12*a* of the camera 10 to the closure release 20 and to the ceiling of the cavity 32 and further by the relative position of the closure release 20, which is separately movable and adjusts the position of the camera 10 based on the extension of the attachments 18. In forms other than those illustrated, the points of attachment may be varied in order to achieve the goals of securing the camera 10 within the cavity 32 and coupling the camera 10 to the closure release 20, depending on the particular structure and desired field of view for the camera 10. It will also be appreciated that alternative attachment mechanisms can be used in place of a pair of opposing springs in order to couple the camera 10 to the closure release 20, including mechanisms which fixedly secure the camera 10 directly to the closure release 20 or movably attach the camera 10 to the closure as will be described in some further examples below.

Figure 3:
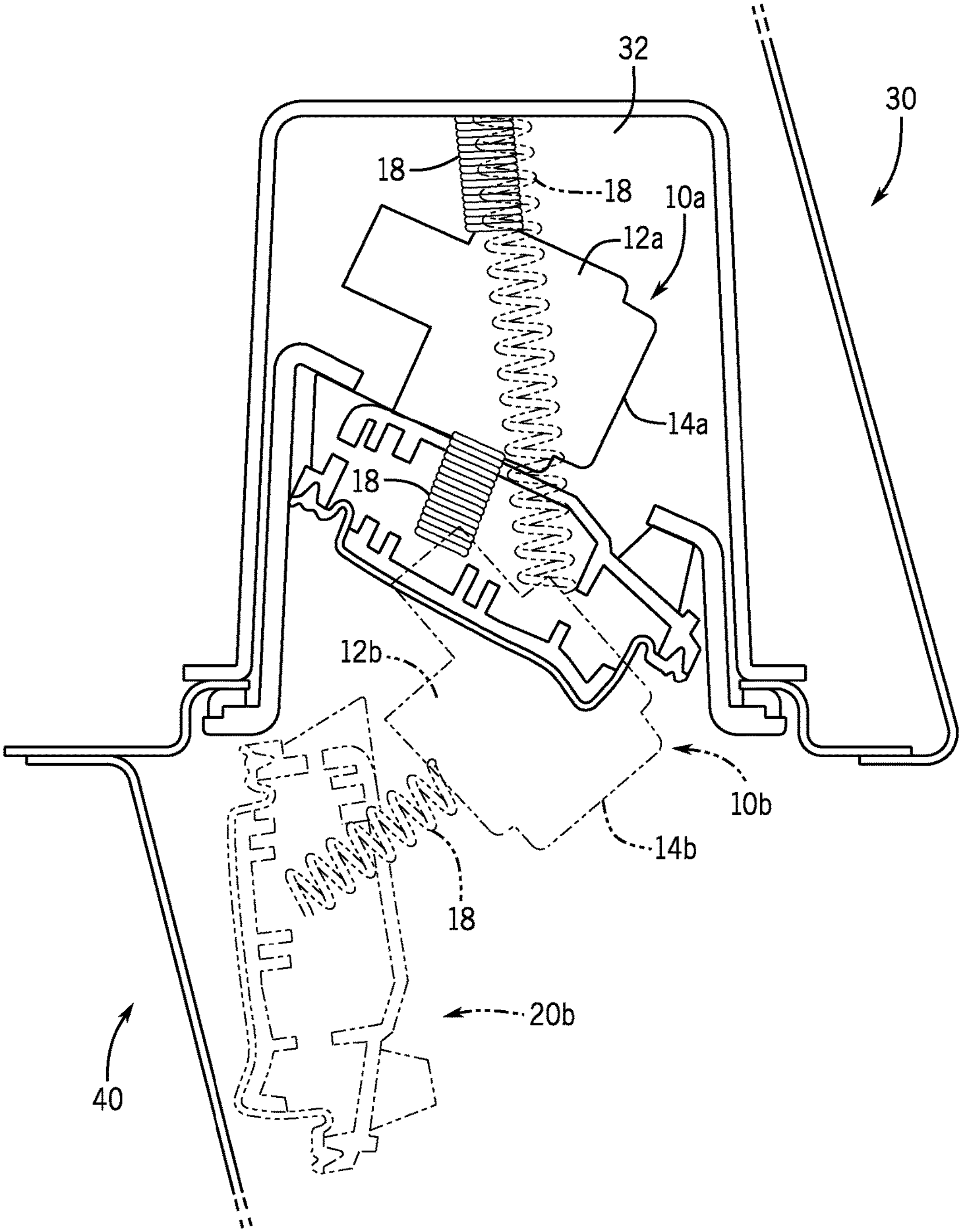
FIG. 3 is an overlay of the cross-sections shown in FIGS. 1 and 2.

The camera 10 is movable between a primary stowed position as depicted in FIG. 1 and a secondary deployed position as depicted in FIG. 2 along a path of travel which is depicted between the overlaid positions illustrated in FIG. 3.

While in the primary, stowed position illustrated in FIG. 1, the camera 10*a* is positioned in the cavity 32 which allows for the camera 10*a* to be protected from environmental debris, such as damage and soiling by swirled-up particles of dust or stones during travel. In this position, the closure release 20*a* remains up in the primary position to substantially close or seal the cavity 32 from the outside environment. However, when the camera 10*a* is stowed, the image sensor 14*a* is incapable of conveying a meaningful image to the display device (since the camera 10*a* is contained in the cavity 32 which typical has opaque walls and is further blocked from an exterior view by virtue of the placement of the closure release 20*a*). In order to capture an image, the camera 10*a* must therefore be transitioned to the deployed position.

A secondary, deployed position in which the camera 10*b* is active is illustrated in FIG. 2. In the depicted position of FIG. 2, the camera 10*b* is secured and substantially retained within the cavity 32 and coupled to the closure release 20*b* and a wall of the cavity 32 with attachments 18 in the form of springs. In addition, as shown in FIG. 2, when the closure release 20*b* is deployed to the secondary position away from the cavity 32, the camera 10*b* projects out of the cavity 32 such that the image sensor is pointed out of or away from the cavity 32.

The camera unit 10 is deployed when the closure release 20 is activated by an actuation mechanism (which is not visible in the particular cross section taken in FIGS. 1 and 2) for moving the closure release 20 from the primary (stowed) position at 20*a* to the secondary (deployed) position at 20*b*. In one example, the actuation mechanism may include one of an electric motor, a force accumulator (e.g., a spring element), a manually-operated fixed assembly, and the like. An exemplary actuation mechanism will be illustrated and described in greater detail below with reference to FIGS. 7 and 8.

In order to initiate the movement of the actuation mechanism, there may be one or more activation elements that, when activated, send a signal to the actuation mechanism to move the closure release 20 to a particular position. As one example, the activation element may be a mobile radio key which is assigned to the motor vehicle that produces a wireless signal and the actuation mechanism may be configured to operate, at least in part, in response to the wireless signal from a mobile radio key which is assigned to the motor vehicle. Another example of a potential activation mechanism may be a control or button located in an interior of the vehicle such as a door lock. When the door lock is used for example (i.e., put in a locked position), a signal may be sent to a control system that communicates with the actuation mechanism. Other controls may be, for example, buttons on the dashboard or touch screen controls. Again, the actuation mechanism may be configured to operate, at least in part, in response to a signal from a button located in an interior of the vehicle. Still yet, a signal may be produced in response to the use of a gear shifting device by the driver of the vehicle and the actuation mechanism can be configured to operate, at least in part, in response to the signal resulting from an operation of a gear shifting device. For example, the closure release may move from the primary position to the secondary position to deploy the camera when the signal from the operation of a gear shifting device is produced in response to a user shifting the gear shifting device into reverse (as this would indicate that use of the backup camera may be desirable). Additionally, the closure release may be moved from the secondary position to the primary position to stow the camera when the signal from the operation of a gear shifting device is produced in response to a user shifting the gear shifting device out of reverse.

Turning now to FIGS. 4A through 4D, alternative embodiments are schematically illustrated for deployment of the camera.

Figure 4A:
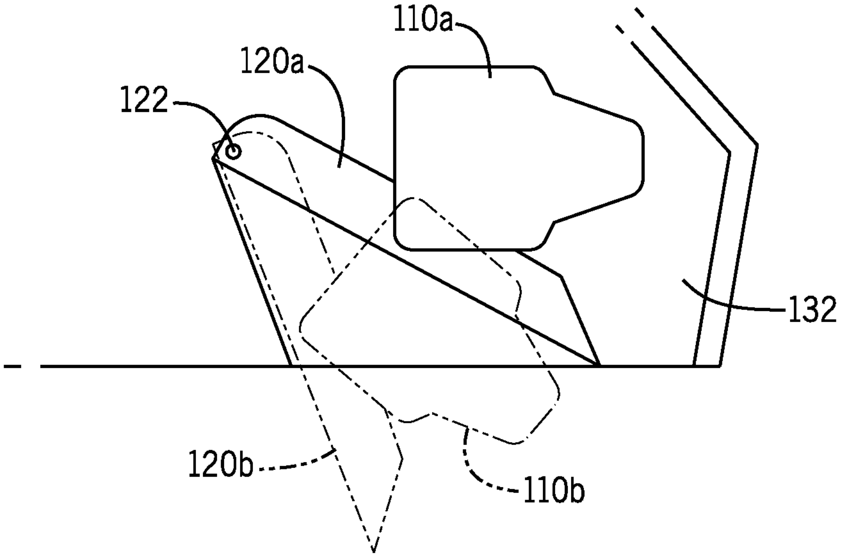
FIG. 4A is a cross-sectional view schematically illustrating a rotational deployment of a camera.

For example, FIG. 4A illustrates a rotational transition of the camera 110. In the illustrated structure, the camera 110 is directly mounted onto the closure release 120 so that the camera 110 pivots purely on the axis of rotation 122 of the closure release 120. In this way, the camera 110 pivots or rotates from the stowed position in the cavity 132 (at 110*a* with the closure release at 120*a*) into the deployed position (at 110*b* with the closure release at 120*b*) to provide a desired field of view for the camera 110.

Figure 4B:
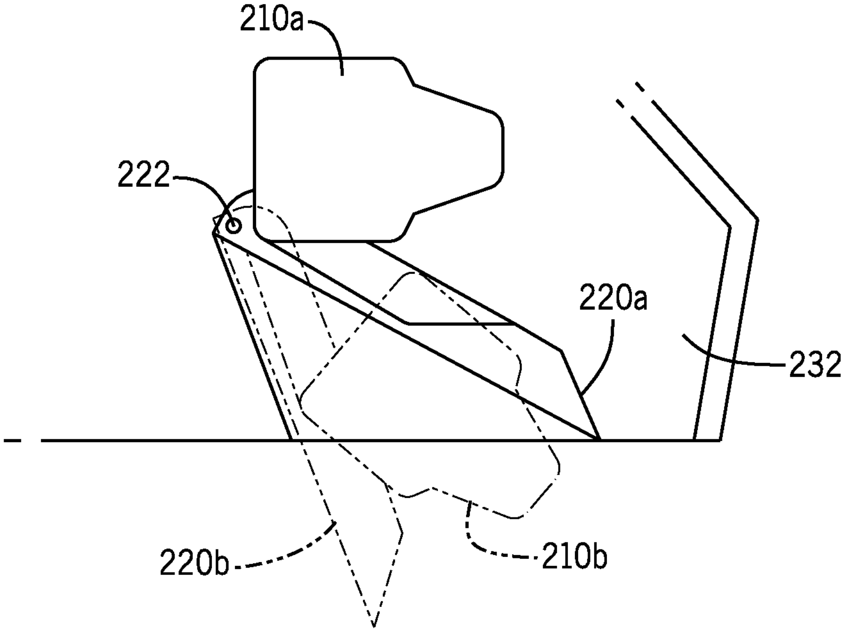
FIG. 4B is a cross-sectional view schematically illustrating a rotational and translational deployment of a camera.

FIG. 4B illustrates another embodiment in which the camera 210 translates relative to the closure release 220 from a position inside the cavity 232 at 210*a* to a position extending out of the cavity at 210*b*. This translation relative to the closure release 220 occurs as the closure release 220 is actuated by pivoting about axis 222 between the primary and secondary positions depicted at 220*a* and 220*b*, respectively. In this illustrated alternative embodiment, the camera 210 does not undergo any substantial rotation relative to the closure release 220 (although the closure release 220 does rotate during actuation, thereby rotating the camera 210 with it). However, it is also contemplated that by limiting the freedom of movement of the camera 210, the camera 210 could be potentially made to move purely translationally without any rotation relative to the closure.

Figure 4C:
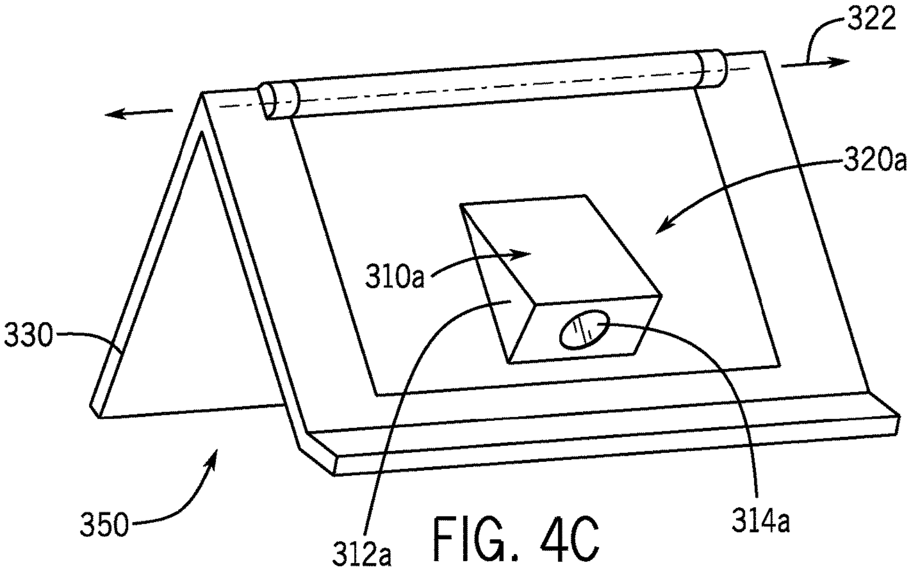
FIGS. 4C and 4D are stowed and deployed views respectively of a rotatable closure release with a camera mounted on the inward facing side of the closure release when the closure release is in the primary position.
Figure 4D:
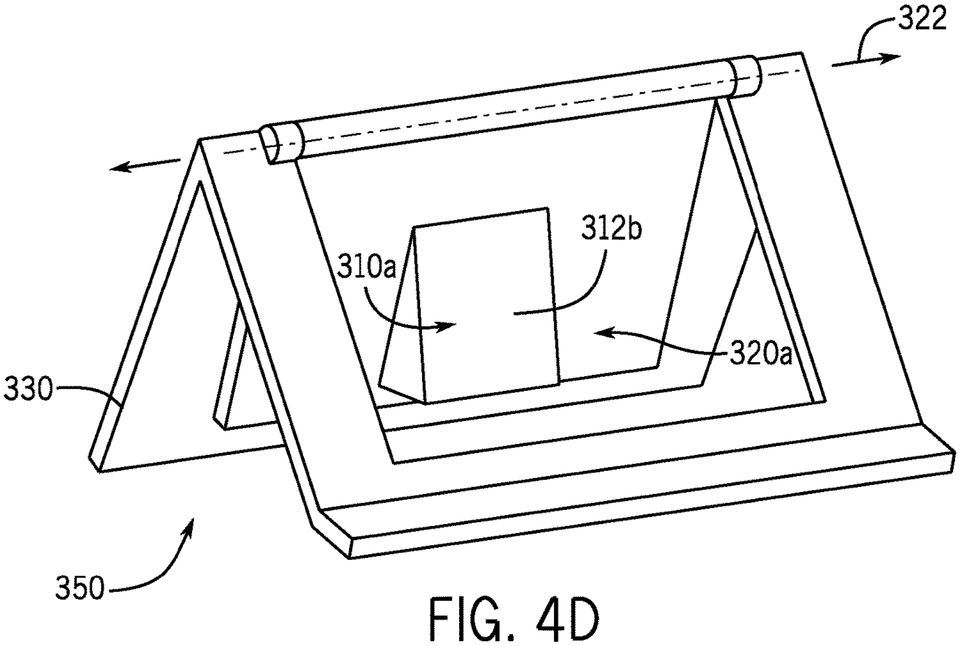

Finally, FIGS. 4C and 4D illustrate yet another embodiment in which the camera 310 purely pivots about an axis of rotation 322 for the closure release 320. In FIG. 4C, the camera 310*a* is shown mounted to the back surface of the closure release 320*a*. This view illustrates, in particular, the presence of a handle pocket 350. A user may operate the closure release 320*a* by placing a hand into the handle pocket 350 and contacting the side of the closure release 320 that is not visible in these views in order to uncouple the closure 330 from the motor vehicle. While in the primary position of FIG. 4C in which the closure release 320*a* is accessible to the user through the handle pocket 350, the camera 310*a* does not obstruct the operation of the closure release 320. Furthermore, the user cannot accidently contact the image sensor 314 of the camera 310 in this position, thereby preventing the image sensor 314 from becoming soiled, scratched, or otherwise damaged by a user. When it is desirable that the camera 310 be deployed for use, the camera 310 then pivots on an axis 322 of the closure release 320 into the secondary deployed position via controlled actuation of the closure release 320 as illustrated in FIG. 4D. In this position, the camera 310*b* rotates into the handle pocket 350 with the closure release 320*b* to provide a useable field of view from the camera 310*b*.

Figure 5:
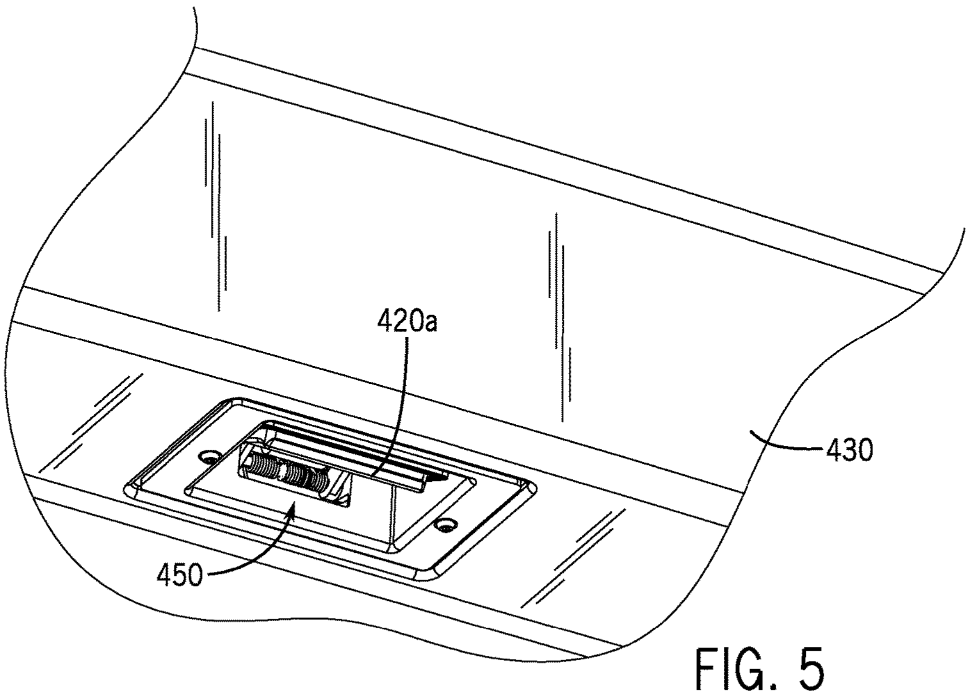
FIG. 5 is a perspective view of another embodiment of the invention in which the closure release is shown in a closed position with the camera stowed.
Figure 6:
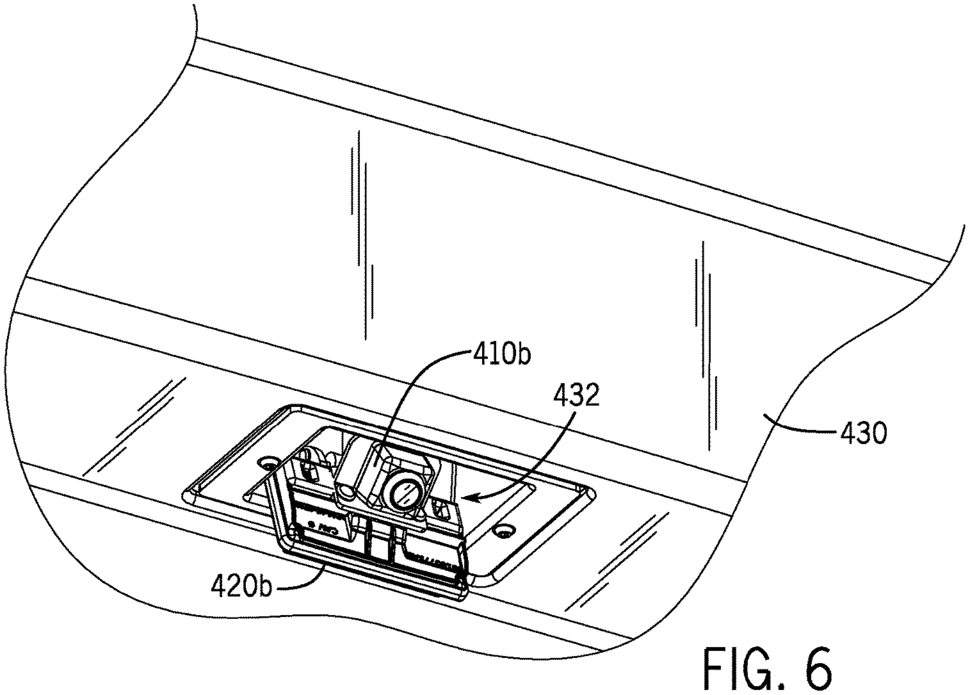
FIG. 6 is a perspective view of the embodiment of FIG. 5, but in which the camera has been actuated to the deployed position to obtain the desired field of view.
Figure 7:
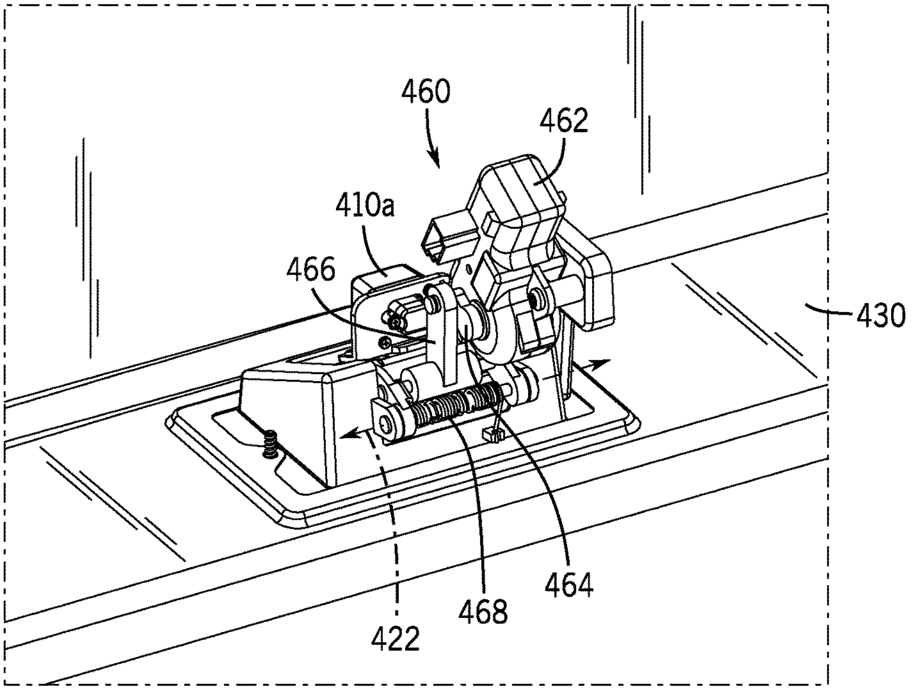
FIG. 7 is a rear side perspective view showing the interior actuation mechanism of the embodiment of FIG. 5 and as positioned in FIG. 5 in which the camera is in the stowed position.
Figure 8:
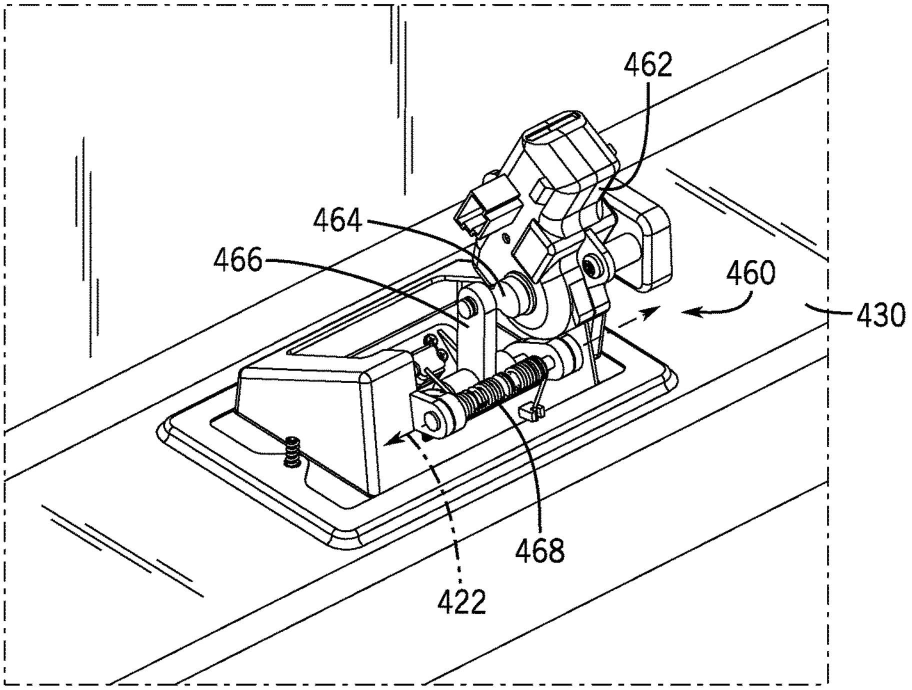
FIG. 8 is a rear side perspective view showing the interior actuation mechanism of the embodiment as positioned in FIG. 6 in which the camera is in the deployed position.

Turning now to FIGS. 5 through 8, a more detailed embodiment of an apparatus is illustrated in which the actuation mechanism is better illustrated in FIGS. 7 and 8.

Looking first at FIGS. 5 and 6, a closure 430 is illustrated in which the closure release 420 is illustrated in the primary position in FIG. 5 (at 420*a*) and the secondary position in FIG. 6 (at 420*b*). As with prior embodiments, the camera 410 is stowed in FIG. 5 (and. thus, not illustrated in FIG. 5 but shown in FIG. 7 in the interior of the closure 430) and deployed in FIG. 6 (at 410*a*) from the cavity 432. With the camera 410 stowed in the primary position and the closure release 420 up in FIG. 5, a handle pocket 450 is provided such that the a user can contact the bottom surface of the closure release 420*a* to selectively uncouple the closure 430 from the vehicle to permit the closure to be swung open.

In the particular form illustrated in FIGS. 5 through 8, the camera 410 is rigidly mounted to the closure release 420, akin to the arrangement schematically illustrated in FIG. 4*a*.

Notably, the actuation mechanism 460 that is used to move the closure release 420 between the primary and secondary positions of FIGS. 5 and 6, respectively, is illustrated in FIGS. 7 and 8. The actuation mechanism includes a motor 462 that rotatably drives and arm 464. This arm 464 is connected to a linkage 466, which in turn connects to the closure release 420 at a location spaced from the axis of rotation 422 of the closure release 420.

To maintain the closure release 420 in the primary position of FIGS. 5 and 7, the motor 462 can drive the arm 464 up to lift the linkage 466 and bring the closure release 420 in the primary, closed position. A biasing member 468, illustrated in the form of a helical biasing spring, may further be used to cause the closure release 420 to be biased and maintained in the primary position either by direct engagement and upward biasing of the closure release 420 or through a biasing of a member of the actuation chain such as the linkage 466.

Then to move the closure release to the secondary position of FIGS. 6 and 8, the motor 462 can drive the arm 464 down to depress the linkage 466 and pivot the closure release to the secondary, opened position. It is contemplated that the motor 462 may need to continually be supplied power in this condition in order to overcome the biasing force of the biasing member 468 only if the back drive of the motor assembly in not higher than the biasing force of the biasing member 468.

Those have skill in the art will appreciate that this is merely a single example of an actuation mechanism and will consider that variations can be made to this structure. Such variations may present alternative linkage arrangements or biasing arrangements (or omit them altogether) for example. Still yet, it is contemplated that the closure release may be biased into a first position and the actuation mechanism may only temporarily be used to move the closure release to a second position and that, when power to the actuation mechanism is discontinued, the closure release may be return solely by the biasing force to its first position. In an alternative embodiment the back drive force of the drive mechanism provides distinct positioning of the camera and release in the primary and secondary positions and the biasing member acts only as an anti-rattle device.

A benefit of the aforementioned embodiments of a camera and closure release of the present invention is that the design of a motor vehicle now includes the option of positioning either or both of the camera and closure release on the centerline of the vehicle. In this way, the closure release is positioned in an intuitive and utilitarian location on the vehicle to allow a user of the motor vehicle to easily operate a rear closure. The camera can be stowed such that it does not obstruct operation of the rear closure. The ability to stow the camera also mitigates the risk of damaging the camera during operation of the closure and while operating the motor vehicle in general. When it becomes advantageous to make use of the camera for obtaining an exterior view of the area to the rear of the vehicle, the camera may then be deployed to an optimal, central position on the centerline of the vehicle.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

The invention claimed is:

1. An apparatus for operating a closure of a vehicle, the apparatus comprising:

a closure release including a contact surface operable to selectively uncouple the closure from the vehicle when contacted by a user, the closure release and the contact surface being rotatable about a pivoting axis relative to the closure when moving between a primary position and a secondary position; and a camera coupled to the closure release and configured to rotate about the pivoting axis in unison with the closure release and the contact surface when the closure release moves between the primary position and the secondary position;

wherein the camera is stowed when the closure release and the contact surface are in the primary position and deployed when the closure release and the contact surface are in the secondary position.

2. The apparatus as in claim 1, further comprising an actuation mechanism for moving the closure release between the primary position and the secondary position along a path of travel.

3. The apparatus as in claim 2, further comprising the closure and wherein, when the closure release is in the primary position, the camera is stowed inside the closure, and when the closure release is in the secondary position, the camera provides a desired field of view.

4. The apparatus as in claim 2, wherein, along the path of travel, the camera translates relative to the closure.

5. The apparatus as in claim 2, wherein, along the path of travel, the camera rotates relative to the closure.

6. The apparatus as in claim 2, wherein the actuation mechanism is configured to operate, at least in part, in response to a signal from a mobile radio key which is assigned to the vehicle.

7. The apparatus as in claim 2, wherein the actuation mechanism is configured to operate, at least in part, in response to a signal from a button located in an interior of the vehicle.

8. The apparatus as in claim 2, wherein the actuation mechanism is configured to operate, at least in part, in response to a signal resulting from an operation of a gear shifting device.

9. The apparatus as in claim 8, wherein the actuation mechanism is configured to move the closure release from the primary position to the secondary position when the signal from the operation of a gear shifting device is produced in response to a user shifting the gear shifting device into reverse and wherein the actuation mechanism is configured to move the closure release from the secondary position to the primary position when the signal from the operation of a gear shifting device is produced in response to a user shifting the gear shifting device out of reverse.

10. The apparatus as in claim 1, wherein, when the camera is in the secondary position, the camera is positioned to provide a rear field of view of the vehicle.

11. The apparatus as in claim 1, wherein the closure release comprises a pivoting pad assembly having a switch thereon which is operable to actuate a latch coupling the closure to the vehicle.

12. The apparatus as in claim 1, wherein the camera is positioned on a centerline of the vehicle in both the primary position and the secondary position.

13. The apparatus as in claim 1, wherein the closure release is positioned on a centerline of the vehicle in both the primary position and the secondary position.

14. The apparatus as in claim 1, wherein both the camera and the closure release are positioned on a centerline of the vehicle in both the primary position and the secondary position.

15. The apparatus as in claim 1, in which the camera is protected from environmental debris when in the primary position.

16. A method for operating a closure of a vehicle, the method comprising:

activating an actuation mechanism to move a closure release having a contact surface and a camera coupled thereto between a primary position and a secondary position, the closure release, the contact surface and the camera rotating in unison about a pivoting axis relative to the closure when the closure release moves between the primary position and the secondary position, the camera being in a stowed position when the closure release is in the primary position and in a deployed position when the closure release is in the secondary position;

contacting the contact surface of the closure release when the closure release is in the primary position to rotate the closure release, the contact surface, and the camera about the pivoting axis, and to decouple the closure from the vehicle at a latch.

17. The method as in claim 16, wherein in the secondary position, the camera provides a desired field of view.

18. The method as in claim 17, wherein the field of view is a rear field of view from the vehicle.

19. The method as in claim 16, wherein both the camera and the closure release are positioned on a centerline of the vehicle in both the primary position and the secondary position.

20. The method as in claim 16, wherein the camera is protected from environmental debris when in the primary position.

* * * * *